United States Patent

Hasunuma et al.

[11] 3,993,629
[45] Nov. 23, 1976

[54] POLYESTER BASED ADHESIVE

[75] Inventors: Kenzo Hasunuma; Hideomi Watanabe, both of Odawara; Nobuo Tsuji, Minami-ashigara, all of Japan

[73] Assignee: Fuji Photo Film Co., Ltd., Minami-ashigara, Japan

[22] Filed: Dec. 23, 1974

[21] Appl. No.: 535,908

[30] Foreign Application Priority Data

Dec. 21, 1973 Japan.................................. 48-3115

[52] U.S. Cl. ............................... 260/75 T; 260/2.3
[51] Int. Cl.² .......................................... C08J 11/04
[58] Field of Search ........................... 260/75 T, 2.3

[56] References Cited
UNITED STATES PATENTS

| | | | |
|---|---|---|---|
| 2,762,789 | 9/1956 | Fisher et al. | 260/75 P |
| 3,350,328 | 10/1967 | Cappucio et al. | 260/75 T X |
| 3,446,758 | 5/1969 | Wiener | 260/75 T |
| 3,453,240 | 7/1969 | Plaster et al. | 260/75 T |
| 3,492,122 | 1/1970 | Takenaka et al. | 96/84 R |
| 3,703,488 | 11/1972 | Morton | 260/75 T X |
| 3,728,287 | 4/1973 | Burmaster | 260/2.3 |

*Primary Examiner*—Lewis T. Jacobs
*Assistant Examiner*—S. M. Person
*Attorney, Agent, or Firm*—Sughrue, Rothwell, Mion, Zinn & Macpeak

[57] ABSTRACT

A polyester based adhesive comprising the reaction product of (a) an aromatic dicarboxylic acid and (b) a glycol component comprising (i) a mixture of ethylene glycol and at least one glycol selected from the glycols represented by the following formula (I), or (ii) a mixture of ethylene glycol, triethylene glycol, and at least one glycol selected from the glycols represented by the following formula (I):

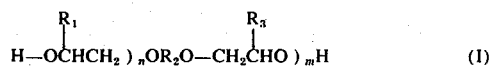

(I)

wherein $R_1$ and $R_3$ each represents a hydrogen atom or a methyl group; $R_2$ is $(CH_2CH_2CH_2)_x(CH_2)_y$, $-CH_2-C(CH_3)_2-CH_2-$, $-CH_2(C_6H_{10})CH_2-$,

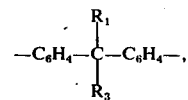

$-C_6H_4-$, $-C_{10}H_6-$, $-C_6H_4-O-C_6H_4-$, $(CH_2CH_2O)_xCH_2CH_2$, $-C_6H_4-C_6H_4-$, $-CH_2C_6H_4CH_2-$, $-C_6H_4-SO_2-C_6H_4-$, or $-C_6H_4CH=CH-C_6H_4-$, and $n$, $m$, $x$, and $y$ each is an integer of from 1 to 10. Alternatively, an embodiment includes a process for producing a polyester based adhesive comprising conducting an ester exchange reaction between polyethylene terephthalate and at least one glycol selected from the glycols represented by the above formula (I), or triethylene glycol and at least one glycol selected from the glycols represented by the above formula (I).

9 Claims, No Drawings

POLYESTER BASED ADHESIVE

BACKGROUND OF THE INVENTION

1. Field of the Invention

The present invention relates to an adhesive useful in adhering metal, plastics, wood, cloth, paper, and the like. More particularly, the present invention relates to an adhesive having strong adhesiveness to various metals. Additionally, the present invention relates to the utilization of, in particular, waste polyester.

2. Description of the Prior Art

Since plastic wastes are generally weather-resistant, and are difficulty decomposed even though allowed to stand exposed to the natural elements, the diposal of the waste now becomes a social problem all over the world.

For example, with regard to polyolefin wastes, polybutadiene wastes, polystyrene wastes, or the like, attempts to obtain monomers by decomposition of the waste by heating have been conducted in Japan. Also, for disposal of polyethylene terephthalate wastes, several attempts have been made for the utilization thereof. For example, the following attempts have been investigated:

1. Recovery of monomers, i.e., terephthalic acid and ethylene glycol, by decomposition
2. Production of molding compositions by blending with other polymers
3. Production of moldings by the addition of a nucleus forming agent (For example, as disclosed in Japanese Patent Laid Open No. 751/1973, British Pat. No. 1,117,139, and the like.)

However, polyethylene terephthalate waste is mainly composed of those polyethylene terephthalates which have been subjected to biaxial stretching and rendered heat stable, and thus the waste is quite stable to chemical reagents, there are no suitable solvents for the waste, and the waste has a high heat-stability, particularly heat-resistance. Due to the above-described original physical properties of polyethylene terephthalate, polyethylene terephthalate wastes are rarely utilized for economic reasons and other reasons with the exception for the recovery of the basic monomers by the Method (1) above is partly attempted by polyethylene terephthalate producers, and, as a matter of fact, polyethylene terephthalate wastes are generally disposed of by burial.

Japanese Patent Publication No. 20313/1968 describes a process for the production of a copolyester suitable for an adhesive which comprises modifying polyethylene terephthalate with glycols to reduce the crystallinity thereof, for the purpose of utilizing polyethylene terephthalate waste. However, it has been found that the polyester produced by the above method has a small degree of crystallinity and when subjected to outdoor exposure, crystallization occurs, reducing the adhesive strength, that is, the polyester has poor weather-resistance.

SUMMARY OF THE INVENTION

An object of the present invention is to provide a good adhesive produced from waste polyethylene terephthalate.

Another object of the present invention is to provide an adhesive having a strong adhesiveness to wood, cloth, paper, plastics, and particularly metal.

A further object of the present invention is to provide an adhesive which can be easily handled and has excellent weather-resistance.

A still further object of the present invention is to provide a process whereby waste polyethylene terephthalate can be utilized.

An even further object of the present invention is to provide a process for the production of a novel plastic.

Another object of the present invention is to provide a process for the production of a plastic having a low glass transition temperature (Tg).

Also an object of the present invention is to provide an adhesive comprising terephthalic acid and at least two glycols.

In addition, an object of the present invention is to provide a process for the modification of polyethylene terephthalate.

Thus, the present invention provides a polyester based adhesive comprising the reaction product of an aromatic dicarboxylic acid component and a glycol component wherein the glycol component comprises (i) ethylene glycol and at least one glycol selected from the glycols represented by the formula (I) or (ii) ethylene glycol, triethylene glycol and at least one glycol selected from the glycols represented by the formula (I)

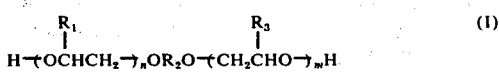

wherein $R_1$ and $R_3$ each is a hydrogen atom or a methyl group; $R_2$ is $-(CH_2CH_2CH_2)_x(CH_2)_y-$, $-CH_2-C(CH_3)_2-CH_2-$, $-CH_2-(C_6H_{10})-CH_2-$,

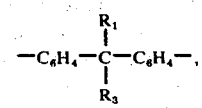

$-C_6H_4-$, $-C_{10}H_6-$, $-C_6H_4-O-C_6H_4-$, $-(CH_2CH_2O)_x CH_2CH_2$, $-C_6H_4-C_6H_4-$, $-CH_2C_6H_4CH_2-$, $-C_6H_4-SO_2-C_6H_4-$, or $-C_6H_4CH=CH-C_6H_4-$, and $n$, $m$, $x$, and $y$ each is an integer of from 1 to 10, and a process for producing a polyester based adhesive utilizing waste polyester comprising conducting an ester exchange reaction between polyethylene terephthalate and at least one glycol selected from the glycols represented by the above formula (I), or triethylene glycol and at least one glycol selected from the glycols represented by the above formula (I).

These and other objects and advantages of the present invention will become apparent from the following description.

DETAILED DESCRIPTION OF THE INVENTION

The polyester produced by the method of the present invention is particularly useful as an adhesive, and thus the present invention will be explained with reference to its adhesive use.

In general, for an adhesive having a high peeling strength, which is an index of practical adhesiveness, the following properties are required:

1. The adhesive must wet well a member to be adhered.
2. The modulus of elasticity of the adhesive must be in a suitable range.

3. The tensile strength of the resin of the adhesive itself is not too low.

An adhesive often must have weather-resistance and durability, but those resins which increase the crystallinity of the adhesive after adhesion, are not preferred since a reduction in the peeling strength occurs as the modulus of elasticity increases, and the like.

On the other hand, if the softing point of the resin is markedly decreased in order to remove the crystallinity completely, blocking occurs between the resins and thus handling becomes difficult. It has been found that the adhesive of the present invention has the above-described properties (1), (2), and (3), and the crystallinity thereof can be substantially completely eliminated by selecting suitably the kind or amount of the glycol used for the modification, and thus that weather-resistance is improved and blocking property is controlled to a minimum.

Processes for the production of polyester used in the invention are well known and described in detail in, for example, Murahashi et al., *Gosei Kobunshi (Synthetic Polymer) V*, Chapter 4, Asakura Shoten, Tokyo (1971).

A polyester which is paticularly well known from the standpoint of the materials emloyed therein is a polyester containing an aromatic dicarboxylic acid and a glycol as the main components. Representative examples of dicarboxylic acids are terephthalic acid, isophthalic acid, p-β-oxyethoxy benzoic acid, diphenylsulfone dicarboxylic acid, diphenoxyethane dicarboxylic acid, adipic acid, sebacic acid, azelaic acid, 5-sodium sulfoisophthalic acid, diphenylene dicarboxylic acid, 2,6-naphthalene dicarboxylic acid (as disclosed in Japanese Patent Publication No. 40,414/1973), etc. Representative examples of glycols are ethylene glycol, propylene glycol, butanediol, neopentyl glycol, 1,4-cyclohexanediol, 1,4-cyclohexanedimethanol, 1,4-bisoxyethoxybenzene, bisphenol A, bisphenol A-ethylene oxide adduct, diethylene glycol, and the like.

The polyester produced by the method of the present invention is different from hitherto known polyester in that ethylene glycol and the compounds represented by the following formula (I)

(I)

wherein $R_1$ and $R_3$ each is a hydrogen atom or a methyl group; $R_2$ is $-(CH_2CH_2CH_2)_x(CH_2)_y-$, $-CH_2-C(CH_3)_2-CH_2-$, $-CH_2-(C_6H_{10})-CH_2-$,

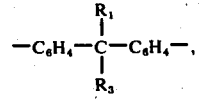

$-C_6H_4-$, $-C_{10}H_6-$, $-C_6H_4-O-C_6H_4-$, $-(CH_2CH_2O)_x CH_2CH_2$, $-C_6H_4-C_6H_4-$, $-CH_2C_6H_4CH_2-$, $-C_6H_4-SO_2-C_6H_4-$, or $-C_6H_4CH=CH-C_6H_4-$, and $n$, $m$, $x$, and $y$ each is an integer of from 1 to 10, are used as the glycol component of the polyester. Thus, it goes without saying that hitherto known processing parameters such as reaction temperatures, reaction pressures, reaction methods, and polymerization catalysts can be used in the production of the polyester of the present invention.

An adhesive can be produced from the diol component represented by the above formula (I), ethylene glycol, and terephthalic acid.

Of the diols represented by the above formula (I), those diol compounds represented by the following formulae (Ia) to (Id) are useful from the standpoint of their use in the polyester adhesive obtained.

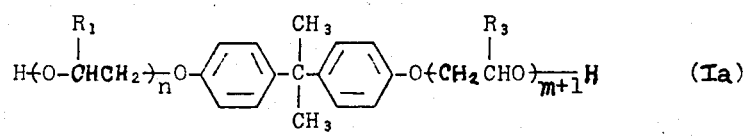  (Ia)

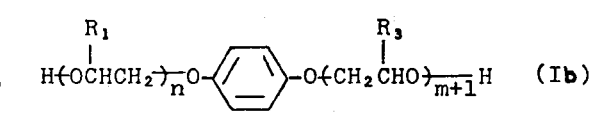  (Ib)

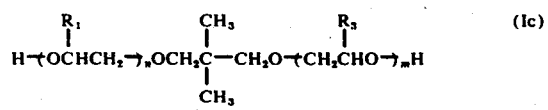  (Ic)

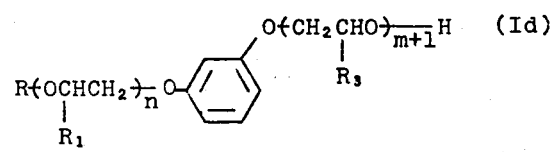  (Id)

wherein $m$, $n$, $R_1$, and $R_3$ are the same as defined above for the general formula (I).

Furthermore, a polyester produced from at least one glycol selected from the glycols represented by the above formula (I), ethylene glycol, and triethylene glycol, is particularly excellent as an adhesive.

Typical combinations using the above glycols of the formula (I) and dicarboxylic acids as the acid component are described below.

(a) 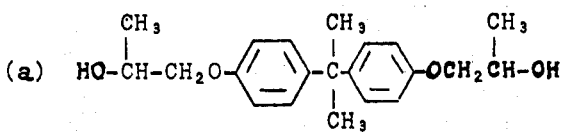

and triethylene glycol as the glycol component and terephthalic acid as the acid component.

(b) 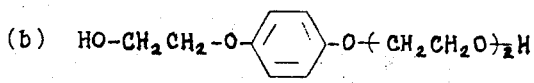

and ethylene glycol as the glycol component and isophthalic acid and adipic acid as the acid component.

(c) 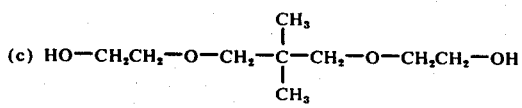

and triethylene glycol as the glycol component and terephthalic acid and adipic acid as the acid component.

As described above, an adhesive can be produced from the acid component and the specific glycol component. However, from the standpoint of the prevention of environmental pollution and utilization of waste plastics, waste polyesters can be suitably used as a starting material for reutilization of the waste polyesters.

Thus, the present invention will described from the standpoint of the utilization of waste polyesters. Unless otherwise stated, the polyester as described hereinafter is one produced from terephthalic acid and ethylene glycol, but it is to be understood that the description contained herein can be applied to polyesters produced from other acid components and glycol components.

The technique as described in Japanese Patent Publication No. 20,313/1968 will be described in detail.

In Example 1 of Japanese Patent Publication No. 20,313/1968, the glycol component contained in the polyester is replaced with triethylene glycol by heat-treating polyethylene terephthalate with triethylene glycol alone. Subsequent detailed examination has revealed that the properties of the so-called modified polyester (an ether type polyester) as prepared above vary depending upon the content of triethylene glycol, and the degree of replacement of ethylene glycol.

The results are shown in Table 1 below, and some polyesters having a good adhesiveness (peeling strength) are obtained depending upon the degree of replacement.

TABLE 1

| | Properties of Triethylene Glycol-Modified Polyethylene Terephthalate | | | | | | |
|---|---|---|---|---|---|---|---|
| Sample | Degree[1] of Triethylene Glycol Replacement | Glass Transition Point | Tensile[2] Modulus of Elasticity | Density[3] | | T Peeling Strength[4] | |
| | | | | Amorphous | Crystal | Just after Adhesion | After[5] Annealing |
| | (%) | Tg (° C) | (dyne/cm²) | (g/cc) | (g/cc) | (kg/in) | (kg/in) |
| 1 | 31 | 44 | 1.7 × 10¹⁰ | 1.33 | 1.37 | 0 | 0 |
| 2 | 37 | 34 | 1.2 × 10¹⁰ | 1.32 | 1.36 | 0 | 0 |
| 3 | 47 | 25 | 2.8 × 10⁹ | 1.31 | 1.34 | 12 | 2 |
| 4 | 55 | 20 | 7.3 × 10⁸ | 1.30 | 1.33 | 14 | 7 |
| 5 | 59 | 12 | 8.8 × 10⁷ | 1.30 | 1.32 | 16 | 10 |
| 6 | 70 | 7.5 | 2.4 × 10⁷ | 1.29 | 1.29 | 13 | 12 |

NOTE:
[1] Values measured by NMR analysis; Triethylene glycol component (mole)/Total glycol component(mole) × 100
[2] Measured at 23° C with non-vibration type viscoelastic spectrometer.
[3] Measured at 23° C with density-gradient tube. The amorphous density was measured after melting and rapid cooling. The crystal density was measured when the increase in density stopped after maintaining in an atmosphere at 65° C for about 70 hours.
[4] Based upon ASTMD-1876-69. 23° C; Member to be adhered: an aluminum plate having a thickness of 300 μ and washed with a trichloroethylene vapor; Tensile speed: 30 cm/minute
[5] Measured after maintaining in an atmosphere at 65° C for 200 hours. This strength corresponds to that after subjecting to outdoor exposure for one year, and it is an index of weather-resistance.

As is shown in Table 1, even with the triethylene glycol modified polyethylene terephthalate, where the degree of triethylene glycol replacement is about 50 mole % or less, both the glass transition point and softing point are high, and substantially no adhesiveness is obtained. Thus these resins are not suitable for an adhesive. On the other hand, where the degree of triethylene glycol replacement is about 50 to 60 mole %, the strength just after adhesion is good, but crystallization proceeds due to annealing, resulting in a reduction in adhesive strength. Thus, these resins are disadvantageous from the standpoint of weather-resistance, and cannot be used as a good adhesive.

Where the degree of triethylene glycol replacement is about 70 mole %, the strength just after adhesion is relatively high and the reduction of strength due to annealing is small. These resins are ideal in adhesiveness. However, the softening point is relatively low and blocking between resins is large, and thus these resins are disadvantageous in handling and cannot be used as a good adhesive. Furthermore, where the degree of triethylene glycol replacement increases to about 80 to 90 mole %, the glass transition point of the resin itself is below room temperature, the softening point is low, and blocking between resins occurs. Moreover, in terms of adhesive strength, both the tensile strength and peeling strength are decreased considerably, and thus these resins are not useful for an adhesive.

Thus, an ideal adhesive which is free from the above-described disadvantages, has good weather resistance, and is free from blocking, has been investigated for a long period of time, and as a result of these investigations the present invention has been now developed.

That is, it has been found that modified polyethylene terephthalate copolymers produced by exchanging a portion of the ethylene glycol component of polyethylene terephthalate by heat-treating together with at least one glycol selected from the glycols represented by the above formula (I) or a mixture thereof with other glycols than ethylene glycol, i.e., by an ester exchange reaction, the crystallinity is substantially completely eliminated and substantially no reduction of adhesive strength due to annealing is observed. This shows that these resins can be used as an adhesive having considerably improved weather resistance.

Furthermore, conventional resins which are not at all crystalline, are disadvantageous in handling due to blocking between resins, whereas with the copolymers as prepared above, the glass transition point is not much lower than room temperature and substantially no blocking is observed.

That is, the crystallinity of the thus produced copolymers is completely lost. The copolymers produced have a suitable rubber elasticity, and have a suitably high glass transition point and softening point, and thus they can be used as an adhesive which has high weather resistance, is free from blocking, and advantageous in handling.

In Japanese Patent Publication No. 20,313/1968, various modified polyethylene terephthalate copolymers are produced by heat-treating polyethylene terephthalate with glycols other than ethylene glycol, i.e., an ester exchange reaction, but, as described above, all of the resins produced as described therein using various kind of glycols cannot be used as an adhesive which has excellent weather resistance and which is free from blocking.

For example, in the case of neopentyl glycol:

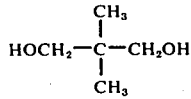

predetermined ester exchange reaction cannot be effected sufficiently by heating a reaction mixture since the boiling point of neopentyl glycol is low (211° C). Thus the exchange of the ethylene glycol portion of polyethylene terephthalate with neopentyl glycol does not occur sufficiently and the softening point of the thus produced resin is high and considerable crystallinity remains. Thus the resin thus produced does not exhibit good properties as an adhesive.

In the case of the reaction between polyethylene terephthalate and a glycol represented by the following formula:

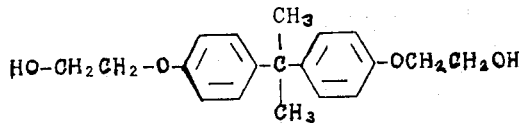

or

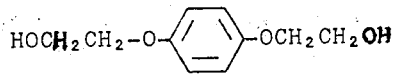

the ester exchange reaction can proceed up to a predetermined extent because the boiling point of the glycol is sufficiently high as compared with that of ethylene glycol. Where the ester exchange reaction proceeds sufficiently, the crystallization of polyethylene terephthalate which occurs in the range of from room temperature to about 100° C disappears, but as can be supposed from the formula of the above glycols, the flexibility of polymer produced is low. Therefore, as predicted from the equation: $\Delta H/\Delta S = Tm$, where $\Delta H$ is the enthalpy of dissolution, $\Delta S$ is the entropy of dissolution, and $Tm$ is the melting point, the melting point of the resin produced is high and thus the resin is not suitable as an adhesive. That is, a sufficient adhesiveness cannot be obtained, particularly in peeling strength.

In the present invention, in order to remove the above disadvantage, the reaction of polyethylene terephthalate and at least one glycol selected from the glycols represented by the above formula, which are produced by effecting the reaction of ethylene oxide and the compounds represented by the following formulae or mixtures thereof with other glycols, has been conducted.

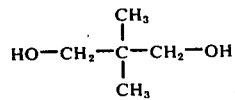

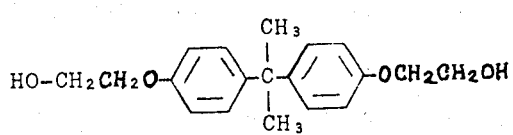

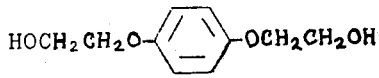

As a result, it has been found that the thus produced resin can be used as an adhesive which has strong adhesiveness, is free from a reduction of strength due to annealing at 70° C, and has excellent weather resistance. Furthermore, it has been found that the resin has a high softening point and is free from blocking between resins, and thus the resin is excellent in handling.

However, the above-described glycols are not those compounds which are not necessarily easily available, and they are difficult to be used as a reactant for use in modifying a polyester. Thus, investigations have been made along this line. As a result of modifying polyethylene terephthalate with the above-described glycols and triethylene glycol, the production of a good resin for use in an adhesive which has excellent adhesiveness and is substantially non-crystalline, has been made possible.

glycol released in the interchange is removed. A suitable period of time for the reaction can range from about 3 to 8 hours, and the degree of polymerization of the modified polyester produced increases as the period of time of the reaction increases.

The thus synthesized polymer is extruded into, e.g., cold water, cut into pellet form, and dried.

Representative examples of modified polyesters of this invention and the properties thereof are summarized in the table below.

| Composition | Acid Component* | Glycol Component* | Production Method | Crystallinity | Glass Transition Temperature (Tg) (°C) | Tensile Modulus of Elasticity (dyne/cm$^2$) | Molecular Weight | Softening Point (°C) | Density (g/cm$^3$) | Tensile Strength (kg/cm$^2$) |
|---|---|---|---|---|---|---|---|---|---|---|
| 1 | Terephthalic Acid | Bisphenol A-Ethylene Oxide Adduct (15 mol)(40%) Ethylene Glycol (60%) | Ester Exchange | Non-crystalline | 20 | 9.5 × 10$^8$ | 10,000~50,000 | About 120 | 1.29 | 110 |
| 2 | Isophthalic Acid (80%) Ortho-phthalic Acid (20%) | 4-(β-Hydroxy-ethoxy)phenyl Diethylene-glycol Ether (70%) Ethylene Glycol (30%) | Condensation | Non-crystalline | 25 | 2.3 × 10$^9$ | 10,000~50,000 | About 140 | 1.31 | 140 |
| 3 | Terephthalic Acid (90%) Isophthalic Acid (10%) | Ethylene Glycol (40%) Triethylene Glycol (40%) Neopentyl Glycol-Ethylene Oxide Adduct (4 mol)(20%) | Ester Exchange | Non-crystalline | 17 | 8.7 × 10$^8$ | 10,000~50,000 | 110 | 1.30 | 100 |
| 4 | Terephthalic Acid (85%) Ortho-phthalic Acid (15%) | Ethylene Glycol (40%) Resorcin-Ethylene Oxide Adduct (3 mol)(60%) | Condensation | Non-crystalline | 13 | 5.3 × 10$^8$ | 10,000~50,000 | 110 | 1.30 | 90 |

*Figures in parentheses are proportions of component in mole %.

Next, the procedure of the present invention will be explained in detail.

When polyethylene terephthalate is added to a mixture of one or more glycols selected from the glycols represented by the above formula (I) and triethylene glycol, and the mixture is gradually heated in a stream of dry nitrogen, the polyethylene terephthalate dissolves in the glycol at about 240° C. The ester exchange reaction temperature preferably ranges from about 250° to 270° C. At this time, if an alkali metal, alkali earth metal, or a derivative thereof, or the like, e.g., a catalyst for the ester exchange reaction as generally used in the production of polyesters, is added, the reaction advantageously proceeds. However, the addition of the additive is not necessarily required. Exchange of ethylene glycol in the polyethylene terephthalate with the glycol added proceeds, the ethylene glycol is distilled off, and the ethylene glycol is removed from the reaction system.

The ester exchange reaction is generally conducted for about 2 to 10 hours, and, in general, a reaction time of about 3 to 6 hours is suitable.

Thereafter, the polycondensation reaction is conducted at the same temperature while maintaining a reduced pressure of about 1 mm Hg or less, and the The thus produced product can be used as it is, or the product can be melt-molded into a film form or string form and used as a hot-melt type adhesive. Also, the product can be used as a solution type adhesive by dissolving the resin in a solvent such as ethylene chloride, methylene chloride, trichloroethylene, or the like.

The quantity of the glycol to be added in the present invention varies depending upon:

1. the kind of glycol represented by the above formula (I), and number of moles of ethylene oxide, or propylene oxide in the adduct; and
2. the kind of glycol to be added simultaneously. Thus it is difficult to set forth the quantity unequivocally. However, the quantity employed (i) in the ester exchange generally is as follows:
   a. where the number of moles of ethylene oxide and propylene oxide in the adduct is about 6 or more, the glycol of the general formula (I) is added in a proportion of about 30 to 150 parts, preferably 50 to 100 parts, per 100 parts of polyethylene terephthalate; and
   b. where the number of moles of ethylene oxide and propylene oxide in the adduct is about 5 or less, the glycol of the general formula (I) is added in a proportion of about 10 to 100 parts, preferably 20 to 60 parts, per 100 parts of polyethylene terephthalate;

c. where the glycol to be added simultaneously is triethylene glycol, the glycol represented by the above formula (I) and triethylene glycol are added in proportions of about 5 to 100 parts, preferably 10 to 60 parts, and about 20 to 70 parts, preferably 30 to 60 parts, respectively, per 100 parts of polyethylene terephthalate; and the quantity employed (ii) in the condensation generally is as follows:

a. the dicarboxylic acid component (with the dicarboxylic acid usually being employed in the form of the methyl ester) in an amount greater than 2 times the molar amount of the glycol component b. where the glycol component includes ethylene glycol or ethylene glycol plus triethylene glycol and the glycol of the general formula (I), particular glycol component ratios are employed, i.e., where ethylene glycol and the glycol of the general formula (I) are used, a molar ratio of the glycol of the general formula (I) to the ethylene glycol of about 0.5:1 to 3:1 is used and where ethylene glycol, triethylene glycol and the glycol of the general formula (I) are used, the molar ratio of the triethylene glycol plus the glycol of the general formula (I) to the ethylene glycol of about 0.5:1 to 3:1 is used with the molar ratio of the glycol of the general formula (I) to the triethylene glycol being at least about 0.3:1 or higher.

Needless to say, a pigment and other additives can be added, if desired, during the ester exchange reaction or prior to use.

In accordance with the method of the present invention:

1. An adhesive can be produced from polyethylene terephthalate waste. 2. An adhesive can be obtained which has strong adhesiveness to various materials, particularly to metals such as stainless steel, copper, zinc plated iron, or the like, which are generally considered metals to be adhered with difficulty. The adhesive also adheres well to polyethylene terephthalate.

3. An adhesive can be obtained which is free from blocking and can be handled with ease.

4. An adhesive can be obtained which has excellent weather resistance and durability.

5. The ester exchange reaction between bisphenol A or neopentyl glycol and polyethylene terephthalate is difficult conduct. However, the ester exchange reaction is made sufficiently possible by using the ethylene oxide or propylene oxide adduct of bisphenol A or neopentyl glycol. Thus, an adhesive which contains bisphenol A, neopentyl glycol, or the like in the structure and has excellent properties can be obtained.

6. An excellent adhesive can be produced by using a typical glycol such as triethylene glycol and the glycol represented by the above formula (I) simultaneously.

The present invention will be explained in greater detail by reference to the following examples. Unless otherwise indicated herein, all parts, percents, ratios and the like are by weight.

EXAMPLE 1

Sample A

| | Quantity (parts) |
|---|---|
| Polyethylene Terephthalate [1] | 100 |
| Bisphenol A-Ethylene Oxide Adduct [2] | 60 |
| Antimony Oxide ($Sb_2O_3$) | 0.05 |

(1) pulverized polyethylene terephthalate (limiting viscosity = 0.61, measured at 30° C in a 6:4 by volume mixed solvent of phenol and tetrachloroethane)

(2)

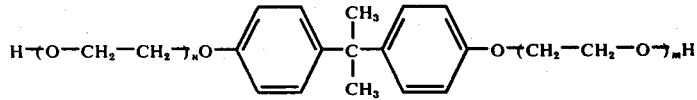

$m + n = 5$ to $10$

The above ingredients were charged to a reaction vessel and stirred in a stream of nitrogen while heating at 270° C, and thus the polyethylene terephthalate was completely dissolved in the bisphenol A-ethylene oxide adduct. After the mixture was kept at this condition for four hours, ethylene glycol began to be liberated due to the ester exchange reaction.

Then, ethylene glycol and other glycols were removed by gradually reducing the pressure in the reaction vessel. On continuing the polycondensation reaction under a reduced pressure of 0.3 mmHg (temperature 270° C), the contents gradually became viscous, and the modified polyester desired was obtained.

The thus obtained polyester was a transparent resinous material of a slightly yellow color, and the limiting viscosity of the thus obtained polyester was 0.53 as measured in methylene chloride at 30° C.

The resin was formed into a film in a thickness of 350 μ using an extruder. With the thus produced film, aluminum plates were adhered. The T peeling strength based upon ASTMD-1876-69 was measured, immediately after adhesion, after annealing at 65° C for 200 hours, and after outdoor exposure for one year.

That is, the above modified polyester film was placed between aluminum plates (thickness 0.3 mm, after degreasing the plates by washing with a trichloroethylene vapor) and heat pressed at 200 ° C for 2 minutes under a pressure of 10 kg/cm². The thus adhered plate was cut to a width of 25 mm, and the sample was subjected to the T peeling strength test. The test was conducted at 23 ± 2° C with the tensile speed being 30 cm/minute.

Furthermore, the above resin was kept or annealed in a thermostat at 65° C for 200 hours, and the density before and after the annealing was measured to determine the progress of crystallization.

The results obtained are shown in Table 2 below.

TABLE 2

| Properties of Sample A | |
|---|---|
| Glass Transition Point (Tg) | 25° C |
| Tensile Elasticity (23° C) | $1.6 \times 10^9$ dyne/cm² |
| Density: | |

TABLE 2-continued

| Properties of Sample A | |
|---|---|
| Before Annealing (23° C) | 1.290 g/cc |
| After Annealing (23° C) | 1.291 g/cc |
| T Peeling Strength (Al/Al): | |
| Before Annealing | 17.5 kg/25 mm |
| After Annealing | 15.7 kg/25 mm |
| After Outdoor Exposure | 15.2 kg/25 mm |

From the results in Table 2, it can be seen that the resin as obtained above was substantially free from crystallinity since no increase in density was observed after annealing at 65° C.

Also, it can be seen that the adhesion strength was excellent in that the adhesion strength was not reduced after annealing at 65° C and after outdoor exposure.

EXAMPLE 2

Sample B

| | Quantity (parts) |
|---|---|
| Polyethylene Terephthalate [1] | 100 |
| Triethylene Glycol | 50 |
| Bisphenol A-Ethylene Oxide Adduct [2] | 30 |
| Antimony Oxide ($Sb_2O_3$) | 0.03 |

(1) limiting viscosity = 0.60
(2)

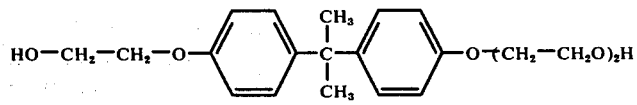

The above ingredients were used in preparing a polyester resin in the same manner as in Example 1. The thus produced resin was used as an adhesive and subjected to the same testing as in Example 1.

TABLE 3

| Properties of Sample B | |
|---|---|
| Glass Transition Point (Tg) | 25° C |
| Tensile Elasticity (23° C) | 3.4 × 10$^9$ dyne/cm$^2$ |
| Density: | |
| Before Annealing (23° C) | 1.293 g/cc |
| After Annealing (23° C) | 1.294 g/cc |
| T Peeling Strength (Al/Al): | |
| Before Annealing | 18.3 kg/25 mm |
| After Annealing | 16.6 kg/25 mm |
| After Outdoor Exposure | 16.0 kg/25 mm |

It can be seen from these results that Sample B had a high adhesion strength and had excellent durability as was the case with Sample A.

EXAMPLE 3

| Sample C | Quantity (parts) |
|---|---|
| Polyethylene Terephthalate (limiting viscosity = 0.58) | 100 |
| Diethylene Glycol | 60 |
| Neopentyl Glycol Propylene Oxide (4 moles) Adduct | 0.05 |

The same production method and testing method as in Example 1 were employed. However, in addition to an aluminum plate, a copper plate (thickness 0.2 mm), a stainless steel plate (SUS-27; thickness 0.3 mm), and an iron plate (thickness 0.3 mm) were used as adherends. The only pre-treatment was degreasing using trichloroethylene vapor-washing.

TABLE 4

| Properties of Sample C | |
|---|---|
| Glass Transition Point (Tg) | 24° C |
| Tensile Elasticity (23° C) | 1.1 × 10$^9$ dyne/cm$^2$ |
| Density: | |
| Before Annealing (23° C) | 1.295 g/cc |
| After Annealing (23° C) | 1.295 g/cc |

The T peeling strength of the adherends is shown in Table 5 below.

TABLE 5

| | T Peeling Strength (kg/25 mm) | | |
|---|---|---|---|
| Plate Adhered | Just After Adhering | After Annealing | After Outdoor Exposure |
| Aluminum | 15.3 | 12.5 | 12.0 |
| Copper | 13.7 | 12.0 | 11.8 |
| Stainless Steel | 20.3 | 16.3 | 15.0 |
| Iron | 19.6 | 18.2 | 18.7 |

It can be seen from the results in Tables 4 and 5 that Sample C had good adhesiveness to copper, stainless steel, iron and the like as well as aluminum, and had excellent weather resistance.

EXAMPLE 4

| Sample D | Quantity (parts) |
|---|---|
| Polyethylene Terephthalate (limiting viscosity = 0.61) | 100 |
| Hydroquinone-Ethylene Oxide (9 moles) Adduct | 70 |
| Antimony Oxide ($Sb_2O_3$) | 0.7 |

The same production method and testing method as used in Example 1 were employed. However, a brass plate (thickness 0.2 mm), a zinc plated iron plate (thickness 0.3 mm), and a polyethylene terephthalate film (thickness 0.2 mm) were used as the member to be adhered for the adhesion strength test, in addition to the aluminum plate. The results obtained are shown in Tables 6 and 7 below.

TABLE 6

| Properties of Sample D | |
|---|---|
| Glass Transition Point (Tg) | 21° C |
| Tensile Elasticity (23° C) | 9.6 × 10$^8$ dyne/cm$^2$ |
| Density: | |
| Before Annealing (23° C) | 1.287 g/cc |

TABLE 6-continued

Properties of Sample D

| | |
|---|---|
| After Annealing (23° C) | 1.288 g/cc |

TABLE 7

T-Peeling Strength (23° C)
T-Peeling Strength (kg/25 mm)

| Plate Adhered | Just After Adhering | After Annealing | After Outdoor Exposure |
|---|---|---|---|
| Aluminum | 16.4 | 16.1 | 16.0 |
| Brass | 12.7 | 11.7 | 11.5 |
| Zinc Plated Iron | 20.3 | 19.8 | 18.9 |
| Polyethylene Terephthalate | 8.8 (substrate broke) | 8.0 (substrate broke) | 7.1 (substrate broke) |

EXAMPLE 5

Modified Unsaturated Polyester (Sample E)

| | Quantity (parts) |
|---|---|
| Polyethylene Terephthalate[1] | 100 |
| Triethylene Glycol | 50 |
| Bisphenol A-Ethylene Oxide Adduct[2] | 30 |
| Antimony Oxide ($Sb_2O_3$) | 0.03 |

[1] pulverized polyethylene terephthalate (limiting viscosity 0.61, measured at 30° C in a 6:4 by volume mixed solvent of phenol and tetrachloroethane

[2]

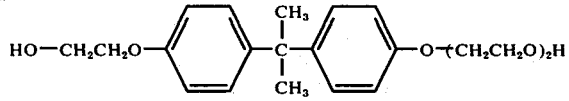

The above ingredients were charged to a reaction vessel and stirred in a stream of nitrogen while heating the mixture at 270° C, and thus polyethylene glycol was completely dissolved in the glycol used. When the mixture was kept at this condition for four hours, ethylene glycol began to be liberated due to the ester exchange reaction.

Then, the pressure in the reaction vessel was gradually reduced to thereby remove the ethylene glycol and excess other glycol. On continuing the polycondensation reaction under a reduced pressure of 0.3 mmHg (temperature 270° C) for 4 hours, the contents gradually became viscous, and the modified polyester desired was obtained.

The thus obtained resin was a slightly yellow color transparent resinous material, and the limiting viscosity of the thus obtained resin was 0.58 as measured in methylene chloride at 30° C.

The resin was formed into a film having a thickness of about 400 μ using a heat press. By using the thus formed film, aluminum plates were adhered. The T-peeling strength based upon ASTM D1876-69 was measured immediately after the adhesion, after annealing at 65° C for 70 hours, and after outdoor exposure for 3 days in summer.

That is, the above modified polyester film was placed between aluminum plates (thickness 0.3 mm, degreased with a trichloroethylene vapor washing) and heat-pressed at 200° C for 2 minutes under a pressure of 10 kg/cm². The thus adhered plates were cut to a width of 25 mm, and the sample was subjected to T-peeling strength test. The test was conducted at 23 ± 2° C with the tensile speed being 30 cm/minute.

Furthermore, the resin was kept in a constant temperature oven at 65° C for 70 hours, and the density before and after the annealing was measured to determine the progress of crystallization.

The results obtained are shown in Table 8.

TABLE 8

| | |
|---|---|
| Glass Transition Point (Tg) | 25° C |
| Tensile Elasticity (23° C) | 3.4 × 10⁹ dyne/cm² |
| Density: | |
| Before Annealing (23° C) | 1.293 g/cc |
| After Annealing (23° C) | 1.294 g/cc |
| T-Peeling Strength (Al/Al): | |
| Before Annealing | 18.3 kg/25 mm |
| After Annealing | 16.6 kg/25 mm |
| After Outdoor Exposure | 16.0 kg/25 mm |

That is, from the fact that no increase in the density of the resin after annealing at 65° C was observed, it can be understood that substantially no crystallization occurred.

Furthermore, the adhesion strength was not reduced after annealing at 65° C and after outdoor exposure, and thus it can be seen that the adhesive was excellent.

EXAMPLE 6

Modified Saturated Polyester (Sample F)

| | Quantity (parts) |
|---|---|
| Polyethylene Terephthalate[1] | 100 |
| Triethylene Glycol | 60 |
| Bisphenol A-Propylene Oxide Adduct[2] | 10 |

[1] limiting viscosity = 0.58
[2]

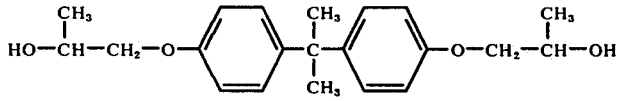

The production method was the same as used in Example 1.

The adhesion strength test was the same as used in Example 1. In this case, however, a copper plate (thickness 0.2 mm), a stainless steel plate (SUS-27, thickness 0.3 mm), an iron plate (thickness 0.3 mm), and a lead plate (thickness 1 mm), in addition to the aluminum plate, were used as adherends.

The only pre-treatment was degreasing using a trichloroethylene vapor washing. The properties and T-peeling strengths are shown in Tables 9 and 10 below.

TABLE 9

Properties of Sample F

| | |
|---|---|
| Limiting Viscosity in Methylene-chloride at 30° C | 0.40 |
| Glass Transition Point (Tg) | 24° C |
| Tensile Elasticity (23° C) | 3.4 × 10⁹ dyne/cm² |
| Density: | |
| Before Annealing (23° C) | 1.295 g/cc |
| After Annealing (23° C) | 1.295 g/cc |

TABLE 10

T-Peeling Strength (23° C)
T-Peeling Strength (kg/25 mm)

| Adherend | Just After Adhering | After Annealing (65° C 70 hrs) | After Outdoor Exposure for 3 Months in Summer |
|---|---|---|---|
| Aluminum | 15.3 | 12.5 | 12.0 |
| Copper | 13.7 | 12.2 | 11.8 |
| Iron | 19.6 | 16.1 | 15.9 |
| Stainless Steel | 20.3 | 18.5 | 18.6 |
| Lead | 12.4 | 10.7 | 10.0 |

As can be seen from the results in the above Tables 9 and 10, the adhesiveness to various kinds of metals is good, and also the resin has excellent weather resistance.

EXAMPLE 7

The ingredients used and the adhesiveness of the polyesters produced from the ingredients are shown in Table 11. In this case, the production method and testing method were the same as used in Example 5.

TABLE 11

| Sample No. | Ingredients (parts) Polyethylene Terephthalate | Triethylene Glycol | Glycol Used Simultaneously Glycol | Glycol Used Simultaneously Amount | Catalyst Sb₂O₃ | T-Peeling Strength (kg/25 mm) Aluminum | Iron | Polyethylene Terephthalate (18) |
|---|---|---|---|---|---|---|---|---|
| G | 100 | 50 | (13) | 15 | 0.01 | 14.8 | 18.2 | 6.3 |
| H | " | 60 | (14) | 12 | 0.01 | 16.4 | 19.3 | 6.5 |
| I | " | 30 | (15) | 25 | 0.03 | 15.3 | 17.5 | 6.0 |
| J | " | 40 | (16) | 25 | 0.03 | 17.2 | 18.0 | 6.0 |
| K | " | 30 | (17) | 60 | 0.05 | 16.1 | 17.3 | 5.8 |

Note:
(13) Neopentyl glycol-ethylene oxide (2 moles) adduct
(14) Bisphenol A-ethylene oxide (2 moles) adduct
(15) Neopentyl glycol-ethylene oxide (4 moles) adduct
(16) Bisphenol A-propylene oxide (3 moles) adduct
(17) Bisphenol A-ethylene oxide (5 moles) adduct
(18) Polyethylene terephthalate (100 μ thick film)
Adhesion:
  150°C × 0.5 minute
Tensile Speed:
  .5 cm/minute Samples G, H, I, J, and K had good adhesiveness to metal and polyethylene terephthalate.

COMPARISON EXAMPLE 1

Triethylene Glycol Modified Saturated Polyester

| | Quantity (parts) Comparative Sample a | Comparative Sample a |
|---|---|---|
| Polyethylene Terephthalate | 100 | 100 |
| Triethylene Glycol | 50 | 40 |
| Antimony Oxide L(Sb₂O₃) | 0.05 | 0.05 |

The production method was the same as that used in Example 1.

The properties and adhesion strength of the above resins are shown in Table 12.

TABLE 12

Properties of Comparative Samples a and b

| | Comparative Sample a | Comparative Sample b |
|---|---|---|
| Glass Transition Point (Tg) | 20° C | 25° C |
| Density: | | |
| Before Annealing (23° C) | 1.304 g/cc | 1.313 g/cc |
| After Annealing (23° C) | 1.325 g/cc | 1.336 g/cc |
| T-Peeling Strength (Al/Al): | | |
| Before Annealing | 16.4kg/25mm | 12.5kg/25mm |
| After Annealing | 8.7kg/25mm | Nearly O |
| After Outdoor Exposure | 8.0kg/25mm | 0 |

Where the glycols of the general formula (I) of his invention were not used, the crystallization proceeded due to annealing and outdoor exposure, thereby reducing the adhesiveness.

With the modification using triethylene glycol alone, if the triethylene glycol is added in a proportion of 70 parts or more per 100 parts of polyethylene terephthalate, crystallization due to annealing and outdoor exposure can be prevented, but blocking occurs to a large extent, and thus the adhesive obtained is not good in handling. Furthermore, the adhesion strength is low.

As can be seen from the Examples and Comparison Example, by using the glycols represented by the above formula (I) as a modifying agent for polyethylene terephthalate, a saturated polyester based adhesive can be obtained which is completely non-crystalline, has good weather resistance and durability, and is good in handling due to low occurrence of blocking thereof.

Particularly preferred of the specific glycols represented by the above formula (I) are ethylene oxide or propylene oxide adducts of bisphenol A, hydroquinone, or neopentyl glycol. It is completely unexpected that the ester exchange reaction would not proceed smoothly unless these adducts are used.

It has been also found that crystallinity can be completely eliminated with ease by using triethylene glycol and a specific glycol of the general formula (I) simultaneously, and that a mofified polyester can be obtained which exhibits adhesiveness and good weather resistance.

While the invention has been described in detail and with reference to specific embodiments thereof, it will be apparent to one skilled in the art that various changes and modifications can be made therein without departing from the spirit and scope thereof.

What is claimed is:

1. A polyester based adhesive comprising the reaction product of (a) a polyester component comprising the reaction product of an aromatic dicarboxylic acid and a glycol and (b) at least one glycol selected from the glycols represented by the formula (I):

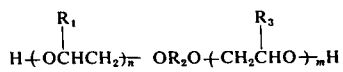

wherein $R_1$ and $R_3$ each represents a hydrogen atom or a methyl group; $R_2$ is $+CH_2CH_2CH_2\overline{)_x}(CH_2\overline{)_y}$, $-CH_2-C(CH_3)_2-CH_2-$, $-CH_2+C_6H_{10}+CH_2-$,

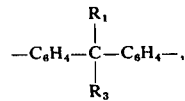

$-C_6H_4-$, $-C_{10}H_6-$, $-C_6H_4-O-C_6H_4-$, $+CH_2C-H_2O\overline{)_x}CH_2CH_2-$, $-C_6H_4-C_6H_4-$, $-CH_2C_6H_4CH_2-$, $-C_6H_4-SO_2-C_6H_4-$, or $-C_6H_4CH=CH-C_6H_4-$; and $n$, $m$, $x$, and $y$ each is an integer of from 1 to 10.

2. The adhesive according to claim 1, wherein the glycol component further contains triethylene glycol.

3. The adhesive according to claim 1 wherein the polyester component (a) is polyethylene terephthalate.

4. The adhesive according to claim 3 wherein the glycol represented by formula (I) is present in an amount of about 30 to 150 parts per 100 parts of polyethylene terephthalate.

5. The adhesive according to claim 2 wherein the polyester component is polyethylene terephthalate and the glycol represented by general formula (I) and triethylene glycol are added in proportions of about 5 to 100 parts and 20 to 70 parts respectively per 100 parts of polyethylene terephthalate.

6. A process for producing a polyester based adhesive which comprises heating polyethylene terephthalate and at least one glycol selected from the gylcols represented by the formula (I):

wherein $R_1$ and $R_3$ each represents a hydrogen atom or a methyl group; $R_2$ is $+CH_2CH_2CH_2\overline{)_x}(CH_2\overline{)_y}$, $-CH_2-C(CH_3)_2-CH_2-$, $-CH_2+C_6H_{10}+CH_2-$,

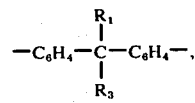

$-C_6H_4-$, $-C_{10}H_6-$, $-C_6H_4-O-C_6H_4-$, $+CH_2C-H_2O\overline{)_x}CH_2CH_2-$, $-C_6H_4-C_6H_4-$, $-CH_2C_6H_4CH_2-$, $-C_6H_4-SO_2-C_6H_4-$, or $-C_6H_4CH=CH-C_6H_4-$; and $n$, $m$, $x$, and $y$ each is an integer of from 1 to 10.

7. A process for producing a polyester based adhesive which comprises heating polyethylene terephthalate, triethylene glycol, and at least one glycol selected from the glycols represented by the formula (I):

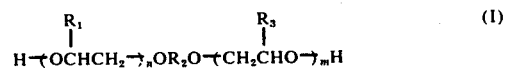

wherein $R_1$ and $R_3$ each represents a hydrogen atom or a methyl group; $R_2$ is $+CH_2CH_2CH_2\overline{)_x}(CH_2\overline{)_y}$, $-CH_2-C(CH_3)_2-CH_2-$, $-CH_2+C_6H_{10}+CH_2-$,

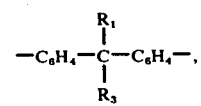

$-C_6H_4-$, $-C_{10}H_6-$, $-C_6H_4-O-C_6H_4-$, $+CH_2C-H_2O\overline{)_x}CH_2CH_2-$, $-C_6H_4-C_6H_4-$, $-CH_2C_6H_4CH_2-$, $-C_6H_4-SO_2-C_6H_4-$, or $-C_6H_4CH=CH-C_6H_4-$; and $n$, $m$, $x$, and $y$ each is an integer of from 1 to 10.

8. The process according to claim 6, wherein the quantity of the glycol represented by the formula (I) is about 10 to 150 parts per 100 parts of the polyethylene terephthalate.

9. The process according to claim 7, wherein the quantity of the triethylene glycol and the glycol represented by the formula (I) is about 20 to 70 parts and about 5 to 100 parts, respectively, per 100 parts of the polyethylene terephthalate.

* * * * *